May 1, 1951  D. V. MEILLER ET AL  2,550,844
NATURAL GAS STORAGE
Filed June 14, 1946  5 Sheets-Sheet 2
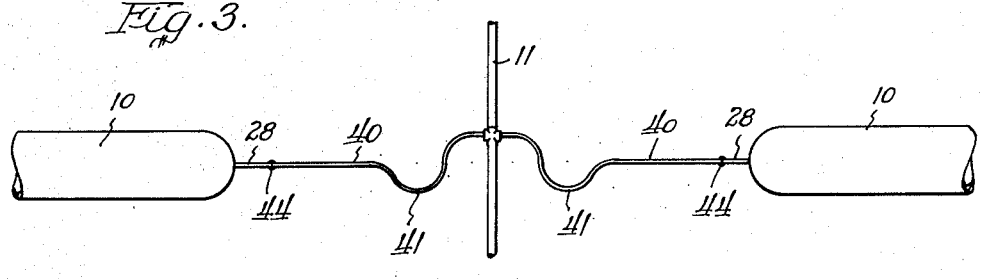
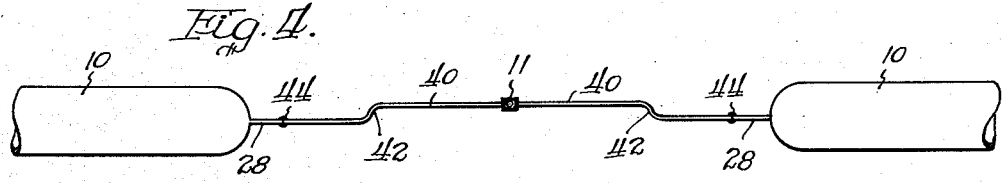
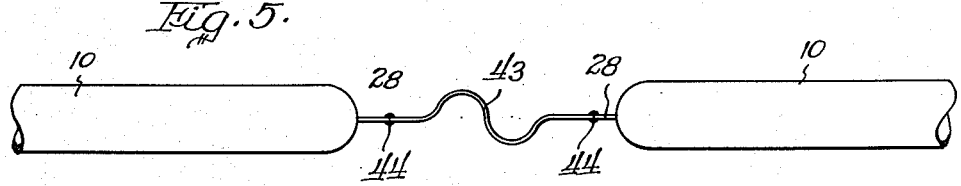
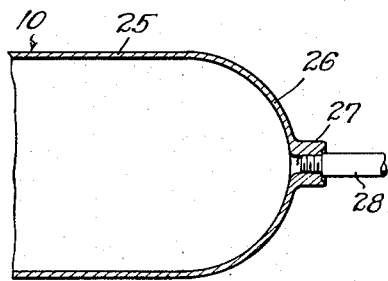
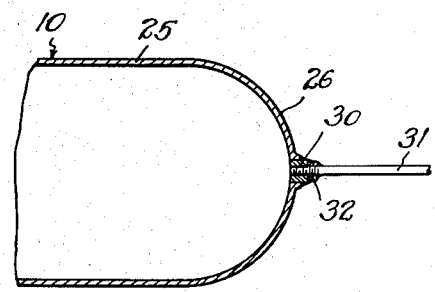
Inventors
Daniel V. Meiller,
Mathew G. Markle.
By Brown, Jackson, Boettcher & Drenner
Attys.

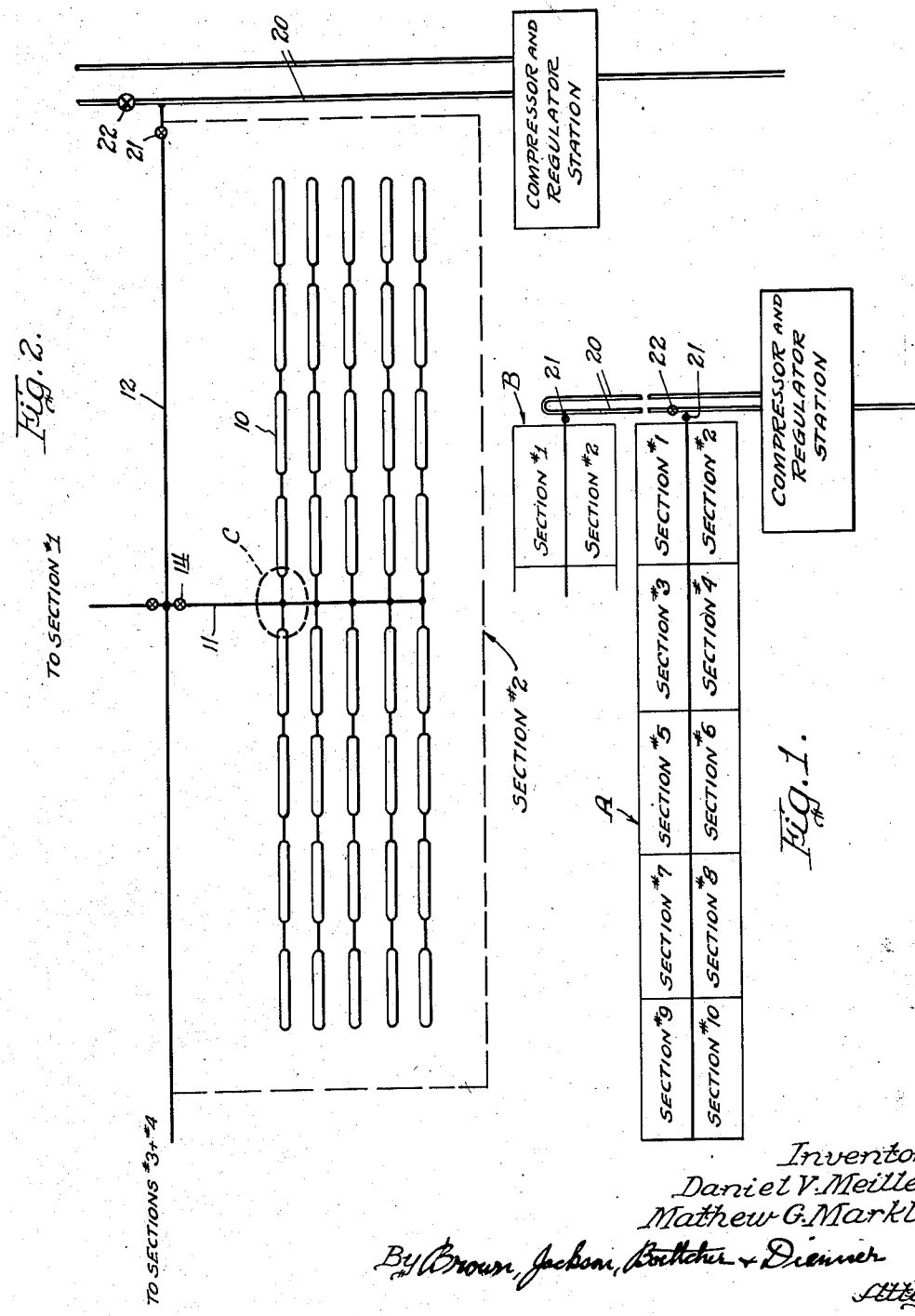

May 1, 1951  D. V. MEILLER ET AL  2,550,844
NATURAL GAS STORAGE
Filed June 14, 1946   5 Sheets-Sheet 3
Fig. 8.
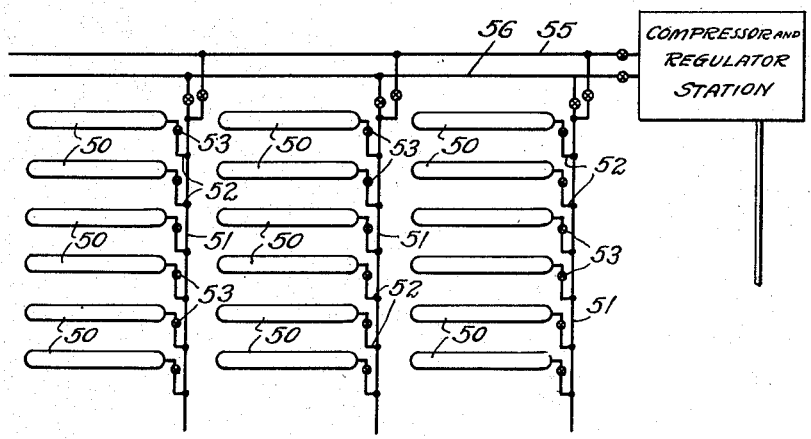
Fig. 9.
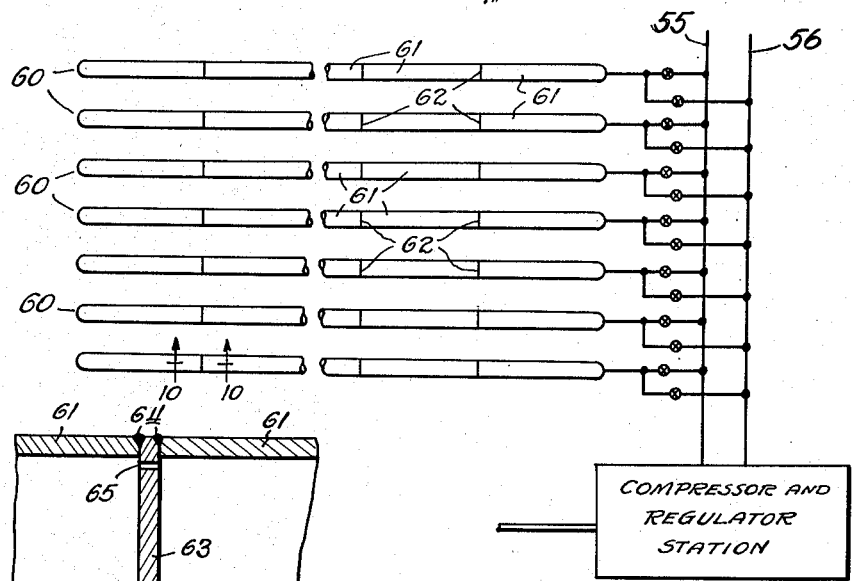
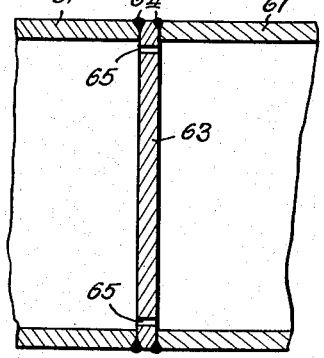
Fig. 10.
Inventors:
Daniel V. Meiller,
Mathew G. Markle.
By Brown, Jackson, Boettcher and Dienner
Attys.

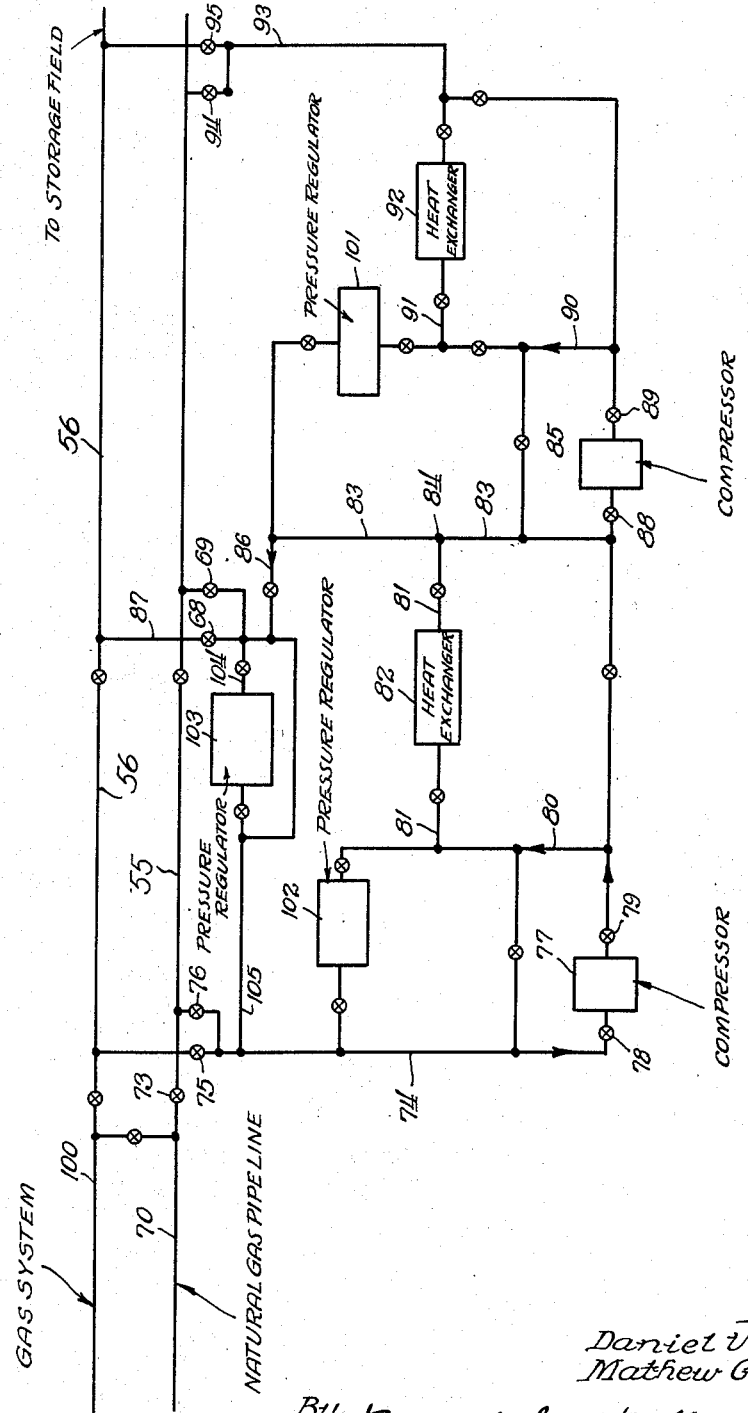

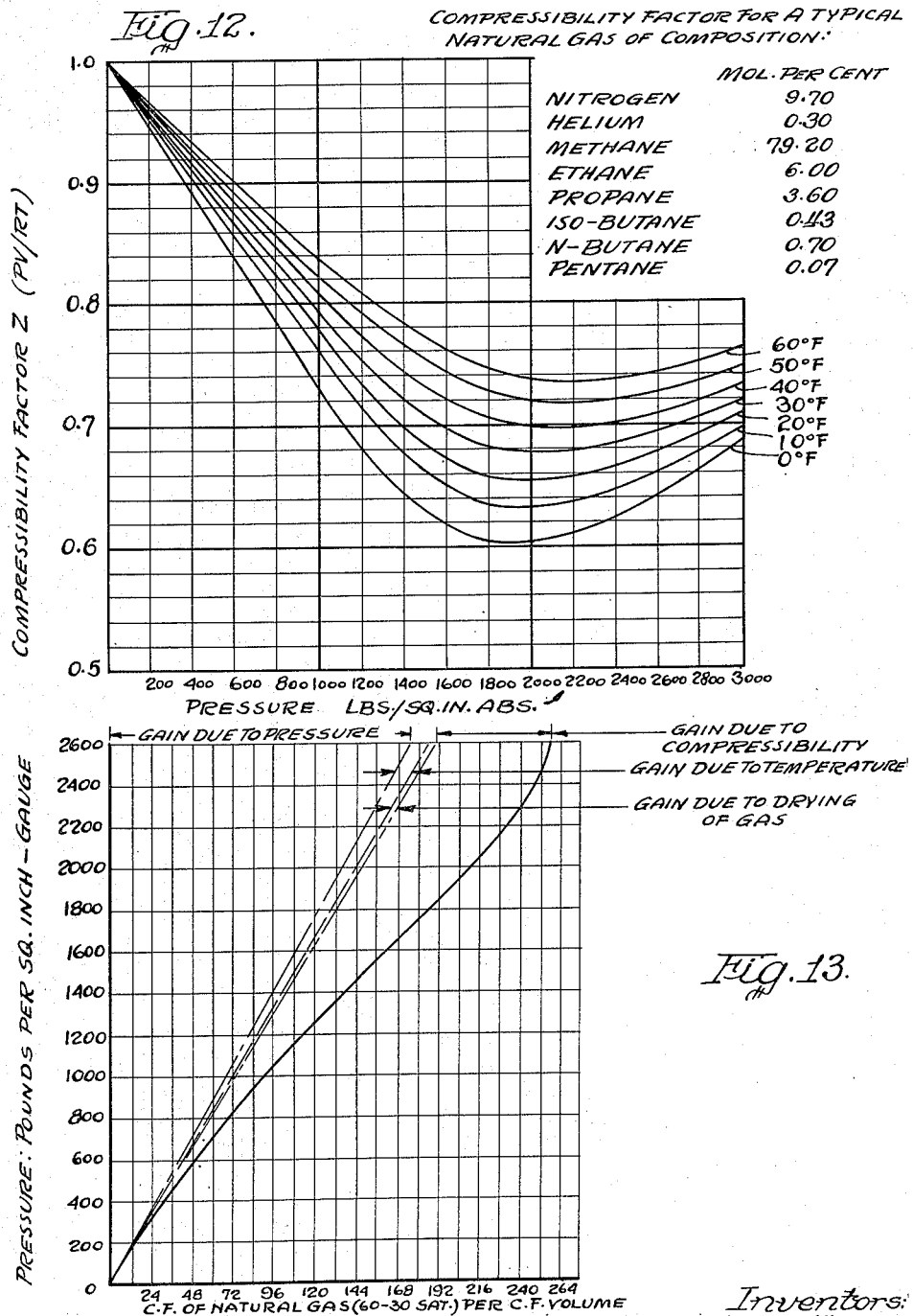

Patented May 1, 1951

2,550,844

UNITED STATES PATENT OFFICE 2,550,844

NATURAL GAS STORAGE

Daniel V. Meiller, Broadview, and Mathew G. Markle, Oak Park, Ill.

Application June 14, 1946, Serial No. 676,844

16 Claims. (Cl. 48—190)

This invention relates, generally, to the storage of gases, and it has particular relation to the reserve storage of relatively large amounts of natural gas in connection with supplying gas distribution systems from natural gas pipe lines, such reserve storage to be drawn upon in case of pipe line failure or unusual demand, and as a means for leveling peak loads upon pipe lines.

Many municipalities, including large industrial installations located therein, utilize as fuel, natural gas supplied through large pipe lines from gas wells many miles distant. With development of such long distance pipe lines and high capacity natural gas transportation therethrough, such municipalities and industrial installations have become more and more dependent upon this source of fuel to the exclusion of manufactured gas or other fuels. Such being the case, the factor of pipe line failure becomes extremely important for obvious reasons. Since the possibility of pipe line failure cannot be wholly eliminated, in order to prevent a complete break in service, or a drastic reduction therein, it becomes necessary to provide a reserve storage capacity of some type. Such reserve storage capacity can be put to further use in connection with local breaks, as distinguished from breaks in the long distance pipe lines. It may also be used in leveling out the peak loads in each 24 hour day.

We have undertaken to evaluate the factors involved in placing reliance for uninterrupted supply upon a natural gas pipe line, and have come to the conclusion that for reasonable assurance of service to consumer, any interruption, i. e., one which could not be foreseen in the making, could probably be repaired in two days' time. This would indicate that the reserve or alternate supply, which should be instantly available, would be adequate if it could supply the customer load for the two day period assumed to be the maximum required to make the repair. Since the break or interruption would be as likely to occur during a period of maximum demand as at any other time, the reserve or alternate supply should be great enough to cover two days (or other determined period) of maximum demand.

For a large metropolitan area, such as the Chicago area, having located therein many industrial installations and plants using natural gas, with the area located in a part of the country subject to sub-freezing weather during the winter months, the reserve storage capacity required may be in the order of five hundred million cubic feet of gas measured under standard conditions.

We are aware that this problem of reserve storage has been previously recognized, and that various solutions of it have been advanced. Patents Nos. 1,956,009 and 2,085,526 to A. J. Diescher, contain a statement of the problem. The solution advanced by this patentee is to string a branch pipe line along the main line where it nears the gas distribution system, and compress as large a volume of gas as possible into the branch lines by means of the pipe line compressors, for use in emergencies or to fill peak demands. The pressures achieved in such a branch line are relatively low.

Another solution to this problem is offered in Patents Nos. 2,070,098, 2,082,189 and 2,091,063 to Lee S. Twomey. This patentee liquefies natural gas and then stores it in the liquefied state in an insulated holder of large capacity.

The solution, or more correctly, the partial solution, offered by Diescher is inadequate, primarily because the reserve storage capacity is much too small and the cost of such storage is unduly high. The solution offered by Twomey (storage in liquefied state) offers certain attractions, especially from the theoretical standpoint. Only a relatively small space is required to store in the liquid state, what would amount to a very large volume of gas in the gaseous state. However, besides requiring an expensive liquefaction plant and necessitating regasification equipment for withdrawing the liquefied gas in quantity and converting it to the gaseous state, a large body of liquefied gas presents a potential hazard although such hazard does not become serious if proper precautions are observed. Another disadvantage of the liquefied storage system is the tendency of the liquefied gas to change its composition over a period of time so that upon regasification, it will have different burning characteristics than it had upon liquefaction.

Various other possibilities were examined, including: provision of alternate supply lines; provision of a sufficiently large number of standard type gas holders; and, compression of fuel gas in elevated spherical tanks. None of these proposals is suitable to the needs of the situation confronting us.

We have conceived a unique combination of factors which offers such an economical solution of the problem of storage that it renders feasible the use of natural gas through pipe line supply with the desired degree of safety and reliability. We propose to use, in conjunction with a natural gas supply line system or like limited supply facility, the capacity of which is not substantially greater than that which is necessary to supply the maximum operating load, a reserve supply of gas great enough to supply the predetermined maximum operating demand during the estimated period required for reestablishing operation of an interrupted supply or portion of such supply.

We have conceived the possibility of economically storing fuel gas, particularly natural gas, by compressing it to substantially a pressure X, disposing the same in a series of communicating pipe chambers, and maintaining the compressed gas in the chambers within a relatively narrow temperature range, which in the preferred practice lies above 32° F. and under 60° F., by disposing the gas in the chambers in thermal contact with the earth, preferably below the frost line, the value X being within the range of values of maximum compressibility of the gas for the aforesaid temperature range.

The object of this invention, generally stated, is the provision of a reserve storage system and method of storage, whereby adequately large quantities of natural gas may be economically and safely stored in such a condition as to be immediately available in a usable condition in case of pipe line failure or other unusual demand.

More specifically, it is an object of our invention to coordinate and exploit to the fullest advantage the following unique set of factors:

1. Natural gas at a temperature of about 40° F., has its optimum compressibility factor at a pressure of about 2150 p. s. i. g.

2. The largest sized pressure containers made from seamless steel tubing that are commercially available at reasonable cost will withstand an internal fluid working pressure of about 2240 p. s. i. g. and these containers are about 2 ft. in diameter permitting them to be buried underground in trenches dug by readily available ditch digging equipment.

3. The ambient earth temperature at the practical depth to which storage containers of this type may be buried is favorable in so far as the compressibility factor is concerned for natural gas at a pressure of around 2150 p. s. i. g.

An important object of the invention is the provision of a reserve storage system and method of storage whereby large quantities of natural gas can be stored in such manner that a high percentage of the stored gas is instantly available at high pressure to supplant or supplement the normal supply thereof.

Another object of the invention is the provision of a reserve storage system having a dual type manifold for use both in filling the system with gas to be stored and to withdraw gas therefrom, whereby the filling and emptying operations may be carried out in the most economical manner and in the shortest time.

An important object of the invention is the provision of improved methods and systems of storing large quantities of gas underground so as to eliminate the hazard of airplane collision, which exists in connection with conventional gas holders which project many feet above ground.

Another object of the invention is the provision of improved methods and systems of storing large quantities of gas in a plurality of containers which are buried under ground to protect them from above-ground hazards and wherein the failure of any one container will not result in damage to adjacent containers.

Another object of the invention is the provision of improved methods and systems of storing large quantities of gas in a plurality of containers buried underground, so as to take advantage of safety code provisions which favor underground disposition of pressure containers.

Another object of the invention is the provision of a reserve storage system for natural gas comprising a plurality of buried containers with each container connected to suitable manifolding by a relatively small gas pipe, or other means providing a restricted orifice, whereby the small pipe automatically acts as a choke to prevent sudden loss of the storage gas in the event of rupture of a single container.

Another object of the invention is the provision of a method of and system for storing large reserve quantities of natural gas wherein a relatively large number of high pressure containers are buried underground to such a depth that the top area may be used for farming and grazing.

Another object of the invention is the provision of an improved storage system for large quantities of natural gas wherein the capacity of the system may be conveniently and readily increased.

Other objects of the invention will, in part, be obvious and will in part appear hereinafter.

For a more complete understanding of the nature and scope of our invention, reference may be had to the following detailed description and discussion thereof taken in conjunction with the accompanying drawings, wherein:

Figure 1 is a diagrammatic layout illustrating a large capacity reserve storage system provided in accordance with our invention;

Figure 2 is an enlarged diagrammatic layout for one of the sections forming a part of the storage system shown in Figure 1;

Figure 3 is a detail plan view of the pipe connections within the area outlined in broken line and designated at C in Figure 2;

Figure 4 is an elevational view of the pipe connections shown in Figure 3;

Figure 5 is a plan view of the end-to-end pipe connection between two adjacent pressure containers in Figure 2;

Figure 6 is an enlarged, fragmentary sectional view showing in detail the end construction and the connection of the small outlet pipes to the ends of the containers shown in Figure 2;

Figure 7 is a view similar to Figure 6 of a modified outlet connection and end construction for the containers;

Figure 8 is a diagrammatic layout, similar to Figure 2, of an alternate form of reserve storage system;

Figure 9 is likewise a diagrammatic layout of still another form of reserve storage system embodying the present invention;

Figure 10 is an enlarged longitudinal sectional view taken on line 10—10 of Figure 9 showing the details of a flow-restricting plate located in one of the points of connection between pipe sections;

Figure 11 is a flow diagram of a compressor and regulator station which may be used in conjunction with the storage systems shown in Figures 1, 2, 8 and 9;

Figure 12 contains curves showing the relationship between the compressibility factor for a natural gas and gas pressure in pounds per square inch gauge, at temperatures ranging from 0° F. to 60° F.; and Figure 13 is a graph whereby gains in storage volume of natural gas at different pressures and at 40° F. are broken down into the various factors involved.

If an ideal gas were to be stored at high pressures, the volume occupied would be in accordance with the well known relationship:

$$\frac{P_1 V_1}{T_1} = \frac{P_2 V_2}{T_2}$$

Thus, if an ideal gas, measured at standard conditions of 60° F., saturated, and at a pressure of 30 inches of mercury, be stored dry at 40° F., the volume of gas (standard conditions) stored per cubic foot of volume of the storage container would be as follows:

*Table I*

| Pressure, p. s. i. g. (Pounds per sq. Inch Gauge) | Cubic feet gas (std. cond.) per cubic foot storage volume |
|---|---|
| 100 | 8.2 |
| 500 | 37.0 |
| 1,000 | 72.9 |
| 1,500 | 108.8 |
| 2,000 | 144.7 |
| 2,500 | 180.6 |
| 3,000 | 216.5 |

However, it is well known that natural gas does not behave as an ideal gas but follows the following realtionship:

$$V = \frac{ZNRT}{P}$$

Where:
V=Volume in cu. ft.
Z=Compressibility factor
N=Number of pound moles
R=10.71 for all gases
T=Absolute temperature (°F.+460)
P=Pressure-pounds per sq. in. absolute Assume a typical natural gas of the following composition:

| Component | Per Cent By Volume |
|---|---|
| Methane | 79.20 |
| Ethane | 6.00 |
| Propane | 3.60 |
| Iso-Butane | 0.43 |
| Normal Butane | 0.79 |
| Pentane | 0.07 |
| Nitrogen | 0.70 |
| Helium | 0.30 |
| Critical Temp. ° R. | 360.5 |
| Critical Pressure p. s. i. a. | 652.3 |
| B. t. u. per cu. ft. 60° F.—30″ Hg-saturated | 1,025.9 |
| Specific gravity | 0.68 |

If a gas of the above composition were stored at high pressure, then by the equation $$V = \frac{ZNRT}{P}$$

the volume of gas (measured at 60° F., 30″ Hg, saturated) per cubic foot of container space at 40° F. with dry gas would be approximately as follows for pressures between 100 and 3000 p. s. i. g.:

*Table II*

| Pressure, p. s. i. g. | CF gas (60° F.—30″ Hg-Sat.) per CF container |
|---|---|
| 100 | 8.4 |
| 500 | 40.9 |
| 1,000 | 91.1 |
| 1,500 | 149.0 |
| 2,000 | 208.2 |
| 2,500 | 255.8 |
| 3,000 | 292.6 |

From the above tables, it is apparent that the quantity of natural gas which can be stored at high pressure, per unit volume of container space, is considerably in excess of the quantity of ideal gas which could be stored under the same conditions. The percentage increase is as follows:

*Table III*

| Pressure, p. s. i. g. | Per Cent Increase in Storage Capacity |
|---|---|
| 100 | 2.4 |
| 500 | 10.5 |
| 1,000 | 25.0 |
| 1,500 | 36.9 |
| 2,000 | 43.9 |
| 2,500 | 41.6 |
| 3,000 | 35.1 |

This increase, due to the super compressibility of natural gas, is shown diagrammatically in Figure 12 of the drawings wherein the values for the compressibility factor Z are plotted as ordinates, and p. s. i. g. values are plotted as abscissae. The compressibility factor Z is inversely proportional to the percentage increase in storage capacity over what would be predicated for an ideal gas. It will be noted from the curves shown in Figure 12 that, for each temperature, the compressibility factor decreases (i. e. becomes more favorable relative to storage capacity) until a minimum point in each curve is reached at pressures ranging from about 1900–2150 p. s. i. g. Thus, for temperatures of from 40–60° F., the maximum benefit may be obtained from the super compressibility characteristics of natural gas, when the gas is stored at a pressure of about 2150 p. s. i. g.

In Figure 13, curves are given which show diagrammatically the gains in respect to storage volume for natural gas due to the factors of pressure; temperature; dry gas; and, compressibility. The legends on the curves serve to identify and explain them.

The fact that natural gas, within the temperature range of from 40–60° F., has its optimum and most favorable compressibility factor at a pressure of about 2150 p. s. i. g., is of particular significance because of the unique way in which this factor fits in with the type of storage containers used and the manner in which the containers are disposed underground. Thus, it happens that the largest diameter, seamless tubing, commercially available at the present time, will safely withstand an internal fluid working pressure of about 2240 p. s. i. g. Such tubing is drawn from alloy steel of high quality, an example being the tubing which conforms to Specification N80 of the American Petroleum Institute, which has a molybdenum content of about 0.18% and a yield point of about 80,000 pounds per square inch. The largest size in which such seamless tubing is available is about 2 ft. in diameter, and as will appear hereinafter, such tubing may be conveniently made into individual containers suitable for burying underground by the use of present day excavating machinery.

In addition to the optimum compressibility factor at about 2150 p. s. i. g., and the fact that this closely coincides with the maximum safe working pressure capacity (i. e. about 2240 p. s. i. g.) of the largest, commercially available, containers suitable for underground location, there is an additional or third factor which enters into the unique relationship and makes the invention not only feasible but advantageous. The third factor is the ambient temperature range at the underground depth to which it is practical to bury the containers.

A ditch or trench can be conveniently dug to a depth of about 5½ ft. with available excavating equipment. When a tubular container 2 ft. in diameter is placed in such a ditch, the earth coverage above the top of the pipe will be about 3½ ft. For the greater part of the United States, the minimum or lowest temperature that will be reached during winter months at such a storage depth will be about freezing, or slightly above. In summer months the highest or maximum temperature that the earth will attain at this depth will be 60° F. and probably, somewhat lower. Thus, it can be assumed that the containers utilized in this invention will be subject to a temperature range of from just above freezing to about 60° F. Of course, for a greater portion of the year the temperature will be at an intermediate value which is subject to only slight day to day variation.

These temperature conditions are favorable to the storage of natural gas under compression to about 2150 p. s. i. g. It will thus be observed that our present invention makes fullest use of the following conditions and factors so as to provide an improved storage system for large volumes of natural gas:

1. Optimum compressibility factor.
2. Maximum safe working pressure capacity of the largest size, commercially available, seamless steel tubing.
3. Underground disposition of storage containers to a depth which modern excavating equipment practically reach and at which depth the ambient earth temperatures are favorable to high pressure storage of natural gas.
4. Favorable safety code provisions.

The details of a presently preferred form of underground storage system, and two modified forms of underground storage systems, provided in accordance with our invention, will be discussed in connection with Figures 1 through 11 of the drawings.

Referring to Figure 1 of the drawings, an underground gas storage installation is diagrammatically shown which provides storage space for 10,000,000 cubic feet of natural gas. The storage area A is shown subdivided in ten sections numbered consecutively from 1 through 10. Storage area B may be similarly sectionalized. As will appear below, each of the sections may be connected through suitable manifolds with a compressor and regulator station, indicated diagrammatically in the figure. The manifolding serves both as a means to introduce gas into the sections for storage, and as a means for withdrawing the gas therefrom when needed.

The space required for area A of the layout shown in Figure 1 is about 591,300 square feet which is equivalent to 13.57 acres. The area may be 2190 feet long by 270 feet wide. It will, of course, be understood that the storage area need not conform to any particular shape, although a regular pattern is desirable.

In Figure 2 of the drawings, the details of Section 2 of the storage system shown in Figure 1, are shown. Section 2, like the other sections, occupies an area of about 56,430 square feet or 1.30 acres. The section area may be 418 ft. long by 135 ft. wide. This area contains 40 separate containers 10 which together provide 1,022,000 cubic feet of gas storage.

The containers 10, for convenience, are arranged in five long rows with eight containers in each row and with each of the containers therein, connected end to end. The rows are spaced about 15 ft. apart (as will be explained below) while the containers in each row are spaced apart about 6 ft. from end to end, except for the two middle containers of each row which are spaced apart about 20 ft. and which connect with a 2" distribution pipe 11 which bisects each of the rows of containers.

A 4" manifold 12 extends along the inner side of the Section 2, in between it and Section 1, so as to be available to both. The main 12 extends the full length of the storage field as shown in Figure 1. The distribution pipe 11 for Section 2 connects with the 4" manifold 12 through a valve 14. The manifold 12 connects with parallel gas main 20 through a valve 21. A valve 22 is disposed in main 20 so as to control communication with area B. The main 20 doubles back on itself, as shown in Figure 1, to provide parallel legs which lead to a compressor and regulator station, the details of which will be described below in connection with Figure 11 of the drawings. By suitable manipulation of valves 21 and 22, and additional corresponding valves, the sections in area A may be charged or discharged independently of or concurrently with, similar sections in another area, such as area B.

Reference may now be had to Figures 3 to 6 of the drawings for a more detailed understanding of the construction of the containers 10 and the manner in which the same are interconnected with each other and with the distribution pipe 11. As shown in Figure 6, each of the containers 10 is formed of a section of seamless alloy steel tubing 25 having a rounded closure 26 at opposite ends. Each of the containers 10 is approximately 40 ft. in length, this dimension being dictated by the fact that it is the maximum length of seamless tubing of the required wall thickness and diameter that can be manufactured with present equipment. The containers 10 are made up in the shop from seamless steel tubing of about 2 ft. outside diameter, 0.446 inch wall thickness, and comply with Specification N80 of the American Petroleum Institute so as to have a molybdenum content of 0.18% and a yield point of 80,000 pounds per square inch. Each container 10 weighs about 4700 pounds and has an internal volume of 112 cubic feet. When stored in the containers under a pressure of about 2240 p. s. i. g., approximately 25,500 cubic feet of natural gas, measured under standard conditions, can be held by each container.

Referring to Figure 6 of the drawings, it will be seen that the ends of each length of pipe 25 of the containers 10, are spun or otherwise rounded so as to form a closure 26. An integral nipple 27 is formed on each rounded end which is internally threaded so as to receive the threaded end of a 1½" gas pipe 28. The threads in nipple 27 and on the end of pipe 28 are carefully made to a close tolerance so as to obtain a tight and sound joint. The tightness of the joint may be improved by various means such as coating or plating the threaded portions with soft metals, or coating them with various compositions which serve to seal the joint.

A modified form of closure for the ends of the containers 10 is shown in Figure 7. A connection is provided in the center of each of the rounded ends 26 in the form of a reinforced collar 30 which is threaded into the end 26 and which may be brazed thereto, as indicated. Each collar 30 is internally threaded so as to receive the threaded end of a 1½" gas pipe connection 31. The joint between the pipe 31 and the collar 30 is reinforced by a nut 32 threaded on the pipe 31 and tightened against the end of the collar 30. The nut 32 may be brazed to the pipe 31 as well as to the collar 30, as shown. Metal of the composition above referred to (i. e. Specification N80) does not lend itself well to the performance of a welding operation in the field with the type of welding equipment ordinarily available or usable in the field, but the types of connections shown in Figures 6 and 7 can be readily made in the field.

In Figures 3 and 4 of the drawings, the details of the conduit connections in the area outlined in area C of Figure 2 are shown, wherein the inner ends of the middle two containers 10 of each row are connected with the distribution pipe 11. Figure 3 is a plan view of the connection at C while Figure 4 is an elevational view. Sections 40 of 1½" piping connect the outlet pipe 28 of each container 10 with the distribution pipe 11. Each of the sections 40 has a horizontal bend 41 therein as shown in Figure 3, and each section 40 is offset at 42 as shown in Figure 4. The bends 41 serve to allow for expansion and contraction while the offsets 42 bring the connections of the sections 40 with the distribution pipe 11 up to the top level of the container 10 in a more convenient and accessible position.

In Figure 5 of the drawings the details of the connections between the ends of adjacent containers 10 in the rows on opposite sides of the distribution pipe 11, are shown. Each connection consists of a length of 1½" gas pipe 43 welded to the short lengths of 1½" gas pipe 28 provided on each end of the containers 10, as indicated at 44. The weld connections at 44 can all be made in the field in accordance with standard welding practice. The connecting lengths 43 are each provided with reverse or S-shaped bends to provide for contraction and expansion.

It will be noted that all of the connections made with the ends 26 of the containers 10 are at the centers thereof, which with the container being 2 ft. in diameter, places the connections 1 ft. above the bottom level of each container. This distance is well above the level of any hydrates or condensation that may collect in the containers. The interconnecting pipes and manifolds should be kept free of such liquid. However, for structural or operating reasons, the container connections may be off center in certain cases.

The containers 10 in each storage section may be conveniently emplaced by excavating trenches for each row of containers to a depth of 5½ ft. and a width of 2½ ft. Such trenches can be readily dug by modern excavating or ditch digging equipment. The containers 10 are transported to and lowered into the trenches at suitably spaced intervals and the pipe connections between the containers are then made, and the installation covered up by filling in the trenches.

In Figure 8 of the drawings, a modified storage system layout is shown wherein the tubular containers 50 are arranged in rows with the individual containers being set side by side, instead of end to end, as in Figure 2. The containers 50 are buried to the same depth underground as are containers 10 and are similarly spaced 15 ft. apart for safety and precaution against damage. The containers in each of the three rows, shown in Figure 8, are connected in parallel to a distribution pipe 51 extending along one side of each row. Separate connections 52 come off from the distribution pipes 51 for connection with each of the separate containers 50. The connections 52 are provided with shut-off valves 53. Each of the three distribution pipes 51 connects with the dual manifolds 55 and 56 which serve to supply the storage system and afford a means of withdrawing gas therefrom. The manifolds 55 and 56 communicate with a compressor and regulator station shown diagrammatically, which is also in communication with the gas distribution system and a natural gas pipe line as indicated. One of the conduits 55 and 56 is normally used as an intermediate pressure line while the other is normally used as the high pressure line. Suitable valves permit the connection of one or more of the rows of containers 50 to be connected to the manifolds 55 and 56 as desired.

In Figure 9 of the drawings, another modified form of storage system is shown which is provided in accordance with this invention. Instead of having a plurality of rows made up of individual containers connected together, or to a common distribution pipe, by means of small diameter piping, as shown in Figures 2 and 8, a system is shown in Figure 9 wherein each row consists of a long pipe 60 made up of any desired number of sections 61, welded end to end as indicated at 62. The lengths of pipe 60 are buried underground as are containers 10, and are of similar construction, except for the matter of length. The individual sections 61 may be as long as 40 ft. The individual pipes 60 need not be of the same length and can vary in accordance with the terrain so that some lengths may be longer than others. The capacity of the system may be readily increased by merely removing the closure end from a length of pipe 60 and welding additional sections thereon. Suitable connections and valves are provided whereby each of the length of pipes 60 may be connected with either of two dual manifolds 55 and 56, as desired. The manifolds 55 and 56 communicate with a compressor and regulator station, shown diagrammatically which is also in communication with a gas distribution system and a natural gas pipe line.

When the pipes 60 are of considerable length, say one-quarter to one-half of a mile, it may be desirable to provide check plates or baffles at suitable intervals. Such plates or baffles will serve the purpose of checking the out flow of the high pressure gas in case of rupture of one of the rows 60. In Figure 10 of the drawings, the details of one of such plates 63 is shown. The plate or disk 63 has a substantial thickness and is inserted between the ends of abutting pipe sections 61 and welded thereto as indicated at 64. The plate 63 is apertured at its periphery as indicated at 65, to provide openings adjacent the top and bottom levels of the container. Additional openings may be provided as required. It will be adequate to have the check plates 63 spaced at about every fourth joint in the long pipes 60. It will be understood, of course, that this interval may be changed as requirements demand.

The buried containers in the systems shown in Figures 1, 2, 8 and 9 should be protected against electrolytic corrosion. Thus, the containers may be made a cathode by connection with buried manganese rods, or rectifiers may be used to give them the proper charge.

Reference may now be had to Figure 11 of the drawings for a detailed description of the pressure and regulator stations referred to in connection with Figures 1, 2, 8 and 9. Although this same type of regulator and compressor station can be used for each of the different types of storage systems above described, it will be understood that other arrangement may also be utilized so long as the underlying principles are adhered to and incorporated.

The operation of the compressor and regulator station shown diagrammatically in Figure 11 will be first described in connection with the manner in which it functions to take in natural gas from a pipe line 70, compress it, and deliver it to a storage field of the types shown above in connection with Figures 1, 2, 8 and 9. The compressor and regulator station includes a pair of parallel mains 55 and 56, and the pipe line 70 connects with main 55 through a valve 73. A line 74 connects with the main 56 through a valve 75 and with main 55 through a valve 76.

By opening valves 73 and 76, natural gas is drawn in from line 70, through line 74 to the inlet side of a compressor 77 adapted to raise the natural gas from a line pressure of say 100 to 450 p. s. i. g. It will be understood that the figures of 100 and 450 p. s. i. g. are illustrative. The pressure in line 70 may be greater or less than 100 p. s. i. g. The compressor 77 (which may represent one stage of a multi-stage compressor) may raise the gas to a pressure within the range of 400 to 600 p. s. i. g., depending upon the line pressure in line 70, the type of compressor, etc. The compressor 77 is provided with suitable valves 78 and 79 on its inlet and outlet sides, respectively. The natural gas compressed to 450 p. s. i. g. leaves the compressor 77 and passes through a line 80 to line 81, which is provided with a heat exchanger 82. The compressed gas is cooled in the heat exchanger 82 and passes therefrom to a line 83. At the point of connection 84 between the lines 81 and 83, the cooled gas stream divides, with part of it passing to the inlet side of a high pressure compressor 85, while the other part passes through lines 86 and 87 to either of mains 55 or 56 depending upon which of the valves 68 or 69 is open.

In compressor 85, the natural gas is raised from a pressure of 400-600 p. s. i. g. to around 2240 p. s. i. g. Compressor 85, may correspond to the last stage of a multi-stage compressor. The compressor is provided on its inlet and discharge sides, respectively, with suitable shut-off valves 88 and 89. Gas leaving the high pressure side of the compressor 85 passes to a line 90 and thence through a line 91 provided with a heat exchanger 92. The heat of compression imparted to the gas in compressor 85 is removed in the heat exchanger 92 and the high pressure gas flows therefrom to a line 93 which communicates with both mains 55 and 56, depending upon which of the valves 94 or 95 is opened.

In this manner, one of the mains 55 or 56 is provided with the natural gas compressed to the intermediate pressure in the range of 400–600 p. s. i. g., while the other main is provided with the gas compressed to a high pressure of about 2240 p. s. i. g. It will be understood that the mains 55 and 56 correspond to double main 20 in Figure 2.

Compressor capacity is utilized to the fullest extent, and the time required for charging is reduced to a minimum, by first filling a section of the containers to the intermediate pressure in the range of 400–600 p. s. i. g. and then switching the section to the high pressure line and filling to the maximum pressure of about 2240 p. s. i. g. Referring to Figures 1 and 2, for example, one of the several areas, say area A, can first be filled to the intermediate pressure. After area A is so charged to the intermediate pressure, it may be switched on to the high pressure manifold and brought up to full charge at about 2240 p. s. i. g. While one or more of the areas is being charged to intermediate pressure, one or more of the areas already so charged, can be brought up to full pressure. The systems shown in Figures 8 and 9, can be charged in a similar manner.

The storage systems will normally be charged by taking the natural gas from the pipe line 70 during periods of minimum load in the gas distribution system, wherein there is an excess of supply over demand. In case of failure of the pipe line 70, or when for some other reason the supply of natural gas is inadequate to meet demand, the shortage, or entire loss, can be supplied from the reserve storage systems such as shown in Figures 1, 2, 8 and 9 of the drawings and described in connection therewith. Since the gas is stored under high pressure in these storage systems, it is immediately available for utilization, except that if the withdrawal rate is sufficiently high, it is necessary to heat the gas expanding from the high pressure of 2240 p. s. i. g. down to say 100 p. s. i. g. or other suitable pressure, for delivery into the gas distribution system 100 (Figure 11).

In withdrawing the gas from storage, it is preferable to first discharge a section or division of the containers through one of the mains 55 and 56 from the high pressure of about 2240 p. s. i. g. down to the intermediate pressure in the range of 400–600 p. s. i. g. After being thus partially discharged, the section of containers is switched to the other main which carries the intermediate pressure. In this manner, the rate at which the gas may be emptied from the storage system may be greatly increased and made sufficient to meet the demand rate.

Still referring to Figure 11, gas discharging at the high pressure is diverted to line 93 and into the heat exchanger 92 which is now used to add heat to the gas. The heated gas leaves the heat exchanger 92 and passes through lines 91 and 90 into a pressure regulator 101, wherein the pressure is reduced down to approximately 450 p. s. i. g. Gas leaving the pressure regulator 101 passes through the line 86 and thence through lines 83 and 81, respectively, into the heat exchanger 82. In heat exchanger 82 additional heat is imparted to the expanding gas and it passes therefrom through line 80 to a pressure regulator 102 which discharges at approximately 100 p. s. i. g. for delivery to the gas system 100 through line 74.

Gas being withdrawn from the reserve storage system at an intermediate pressure is conducted directly to the inlet side of a pressure regulator 103 through line 104 connecting therewith. It is not necessary to impart heat to the gas in this expansion process and the expanded gas leaves the regulator 103 at a pressure of approximately 100 p. s. i. g. and passes through line 105 to line 74 for delivery into the gas system 100.

It will be seen that the heat exchangers 82 and 92 serve a dual purpose in connection with the charging and emptying of the reserve storage systems. Likewise, the compressors 77 and 85 can be put to the additional use of evacuating a storage system of its air content prior to filling the same with natural gas.

In case of damage to, or failure of a storage system at any point, the emptying of the system is self-checking because the small outlet connections, or check plates, for the pressure containers automatically limit the rate at which the gas can be emptied therefrom. This is an important safety feature, and is inherent in the design without restricting the normal rate at which the contents can be withdrawn.

As stated above, the pressure containers in the systems shown in Figures 1, 2, 8 and 9 of the drawings, are preferably spaced apart about 15 ft. The basis for selecting this spacing dimension is that if one of the containers is ruptured when charged with natural gas at a pressure of about 2240 p. s. i. g., and buried underground to a depth of about 3½ ft., the crater effect will not extend beyond 15 ft. on each side of the ruptured container. In this way, failure of one container will not result in damage to the additional containers.

Although, as indicated above, seamless tubing is the preferred material for constructing the pressure containers, other types of containers, such as electrically welded tubing, could be used provided the wall thickness was adequate to withstand a working pressure of about 2240 p. s. i. g.

In case a reserve storage system or installation of the type provided by this invention, is located within a built up area, it may be necessary to reduce the storage pressure to around 1650 p. s. i. g. because of code requirements for built up areas. Although the storage capacity is materially smaller at this reduced pressure, it will still be considerable and will be satisfactory for taking care of local line breaks and for evening out 24 hour peaks.

Since certain further changes may be made in the foregoing constructions, and different embodiments of the invention may be made without departing from the scope thereof, it is intended that all matter described hereinbefore or shown in the accompanying drawings, be interpreted as illustrative and not in a limiting sense.

We claim:

1. For combination with a natural gas supply pipe line and a gas distribution system normally supplied therefrom, a reserve storage system comprising, in combination, a plurality of buried tubular containers made from steel tubing of about two feet in diameter capable of safely withstanding a maximum internal working pressure of about 2240 p. s. i. g., said containers being buried underground in spaced apart relationship to a depth at which the earth temperature does not substantially exceed 60° F. or drop below 32° F., and conduit means in the form of small gas pipe interconnecting said containers whereby the same may be filled with natural gas up to a pressure of about 2240 p. s. i. g. and whereby the gas may be withdrawn therefrom.

2. The reserve storage system of claim 1 wherein said containers are seamless and made of alloy steel not adapted to field welding and are provided with outlet connections in the form of short lengths of small gas pipe, and wherein said gas pipe making up said conduit means is welded to said outlet connections.

3. The reserve storage system of claim 1 wherein the connections of said small gas pipe to said containers are at points above the bottoms of said containers.

4. The reserve storage system of claim 1 wherein said containers are spaced apart a distance of about 15 feet whereby each container is protected from damage due to rupturing of adjacent containers.

5. For combination with a natural gas supply pipe line and a gas distribution system normally supplied therefrom, a reserve storage system comprising, in combination, a plurality of buried tubular containers made from seamless steel tubing of about two feet in diameter capable of safely withstanding a maximum internal working pressure of about 2240 p. s. i. g., said containers being buried underground in spaced apart relationship to a depth at which the earth temperature does not substantially exceed 60° F. or drop below 32° F., multi-stage compressor means adapted to compress natural gas up to a maximum pressure of about 2240 p. s. i. g., outlet connections whereby compressed gas may be discharged from said compressor means at said maximum pressure and at an intermediate pressure, conduit means interconnecting the intake of said compressor means with said natural gas supply line, two manifold conduits extending between said compressor outlet connections and said buried containers, conduit means in the form of small gas pipe interconnecting said buried containers with said manifold conduits, valve means whereby said buried containers may be connected with either of said manifold conduits, and conduit means interconnecting said two manifold conduits with said gas distribution system.

6. The reserve storage system of claim 5 wherein said intermediate pressure is in the range of 400–600 p. s. i. g.

7. The reserve storage system of claim 5 wherein pressure reducing means is interconnected in said last mentioned conduit means interconnecting said two manifold conduits with said gas distribution system.

8. For combination with a natural gas supply pipe line and a gas distribution system normally supplied therefrom, a reserve storage system comprising, in combination: a plurality of buried tubular containers made from seamless steel tubing of about two feet in diameter, formed of alloy steel not adapted to field fabrication, and capable of safely withstanding a maximum internal working fluid pressure of about 2240 p. s. i. g., said containers being provided with outlet connections in the form of short lengths of small diameter gas pipe, and said containers being buried underground in spaced apart regularly arranged relationship to such a depth that the ambient temperature of the earth does not exceed substantially 60° F. nor drop below 32° F., small diameter gas piping connecting said buried containers so as to form a plurality of separate sections each of which includes a sub-group of said containers having a common inlet and outlet connection, said gas piping being connected to the individual containers by welding to said outlet connections provided thereon; a low pressure compressor; a high pressure compressor; conduit means connecting the inlet of said low pressure compressor with said natural gas supply pipe line; conduit means connecting the outlet of said low pressure compressor with the inlet of said high pressure compressor; a dual manifold comprising two conduits extending adjacent said common inlet and outlet connections of said sections of buried containers; gas piping interconnecting each of said common inlet and outlet connections with both conduits of said dual manifold; valve means in said last mentioned gas piping whereby each of said common inlet and outlet connections may be shut off from or placed in communication with either or both of said conduits of the dual manifold; conduit means interconnecting said outlet of said low pressure compressor with both conduits of said dual manifold; valve means in said last mentioned conduit means whereby said low pressure compressor outlet may be shut off from or placed in communication with either or both of said dual manifold conduits; heat exchanger means interconnected with said last mentioned conduit means; conduit means interconnecting the outlet of said high pressure compressor with both conduits of said dual manifold; valve means in said last mentioned conduit means whereby said high pressure compressor outlet may be shut off from or placed in communication with either or both of said dual manifold conduits; heat exchanger means interconnected with said last mentioned conduit means; a conduit interconnecting said gas distribution system with both conduits of said dual manifold; valve means in said last mentioned conduit whereby said gas distribution system may be shut off from or placed in communication with either or both of said dual manifold conduits; pressure reducer means interconnected with said last mentioned conduit; another conduit interconnecting said gas distribution system with both conduits of said dual manifold; valve means in said last mentioned conduit whereby said gas distribution system may be shut off from or placed in communication with either or both of said dual manifold conduits; pressure reducer means interconnected with said last mentioned conduit; and said last mentioned conduit being interconnected with at least one of said two heat exchanger means.

9. In the process of supplying a gas distribution system from a natural gas pipe line, the steps which comprise, compressing to about 2240 p. s. i. g. the portions of the gas being delivered through said pipe line in excess of current demands of said distribution system, a storing said compressed gas underground in a plurality of containers disposed underground in spaced apart relationship to a depth whereat the ambient earth temperature does not depart substantially from the range of 32° F. to 60° F. and whereat there is little or no day to day variation in ambient temperature, said containers being interconnected with piping of relatively small diameter in relationship to the diameter of said containers, and expanding said compressed gas during excess demand periods, and delivering the expanded gas to said distribution system.

10. The method of storing natural gas for reserve use which comprises, disposing in the ground below the normal frost line where the range of temperature variation does not depart substantially from 32° F. to 60° F. and in good thermal contact with the earth a multiplicity of connected pipe containers of substantially great length relative to their diameter, and charging into said containers compressed natural gas at a pressure of from 1650 to 2240 p. s. i. g.

11. Reserve gas storage system comprising a series of interconnected lengths of buried steel pipe constituting elongated tubular reservoirs laid in thermal contact with the earth below the normal frost line and separated from each other by sufficient intervening earth so as to reduce danger of injury to one another by failure and make each individual reservoir thermally independent of the others, said interconnetcted pipe lengths being charged with natural gas compressed to a pressure of from 1650 to 2240 p. s. i. g.

12. The system of claim 11 wherein the interconnected lengths of steel pipe are commercial lengths of steel tubing disposed horizontally and joined end to end and having the outer ends of the terminal lengths swaged down to produce a small diameter opening for interconnection.

13. In connection with the uninterrupted supplying of natural gas to a gas distribution system from a natural gas pipe line as a source of supply, the method of storing a substantial reserve of natural gas immediately available at all times in the event of supply failure from the pipe line and independently thereof, which comprises, charging natural gas at a pressure of not substantially less than 1650 p. s. i. g. into a multiplicity of subterranean pipe containers disposed underground in spaced apart relationship to a depth whereat the ambient earth temperature does not depart substantially from the range of 32° F. to 60° F. and whereat there is little or no day to day variation in ambient temperature, said containers being interconnected with piping of relatively small diameter in relationship to the diameter of said containers.

14. The method of protecting a gas distribution system from failure in supply of natural gas from a natural gas pipe line, which comprises, storing apart from and independently of said pipe line a substantial reserve of natural gas immediately available at all times at a pressure of not substantially less than 1650° p. s. i. g. in a multiplicity of subterranean pipe containers disposed underground in spaced apart relationship to a depth whereat the ambient earth temperature does not depart substantially from the range of 32° F. to 60° F. and whereat there is little or no day to day variation in ambient temperature, said containers being interconnected with piping of relatively small diameter in relationship to the diameter of said containers, releasing natural gas from said containers and discharging the released gas into said distribution system upon a failure in supply from said pipe line.

15. Means for storing a reserve supply of natural gas in such a condition as to be instantly available for substantially complete withdrawal at a high rate of flow by pressure release alone, said means comprising in combination, a multiplicity of subterranean, spaced apart, pipe containers capable of safely withstanding an internal working pressure of at least 2240 p. s. i. g., said containers being disposed to a depth whereat the ambient earth temperature does not depart substantially from the range of 32° F. to 60° F. and whereat there is little or no day to day variation in ambient temperature, and said containers being separated from each other by sufficient intervening earth so as to reduce danger of injury to one another by failure and make each individual container thermally independent of the others, at least one common manifold for supplying gas to and withdrawing gas from said multiplicity of containers, and conduit means in the form of piping of relatively small diameter in relation to the diameters of said containers interconnecting said containers with each other and with said manifold.

16. In a natural gas supply system the method of maintaining a supply of gas available for distribution which consists in putting gas into storage, holding said gas in storage, and taking the same out of storage which comprises compressing the gas to be stored to a pressure at which a substantial gain in compressibilty of the gas occurs and not substantially less than 1650 p. s. i. g., disposing the compressed gas in a subterranean container in thermal contact with the earth and approximately below the frost line whereby the earth serves to abstract heat from the gas during the pressing of the same into storage, said subterranean thermal contact with the earth serving to hold the gas in storage at substantially an even temperature substantially independently of atmospheric influences whereby pressure variations due to atmospheric influence are minimized throughout the year, and said subterranean thermal contact of the gas with the earth serving to permit the gas to abstract heat from the earth during expansion of the gas incident to its being taken out of storage.

DANIEL V. MEILLER.
MATHEW G. MARKLE.

REFERENCES CITED

The following references are of record in the file of this patent:

UNITED STATES PATENTS

| Number | Name | Date |
|---|---|---|
| 1,339,431 | Backhaus | May 11, 1920 |
| 1,956,009 | Diescher | Apr. 24, 1934 |
| 2,021,271 | Thomas | Nov. 19, 1935 |
| 2,085,526 | Diescher | June 29, 1937 |

FOREIGN PATENTS

| Number | Country | Date |
|---|---|---|
| 148,494 | Great Britain | July 10, 1920 |

OTHER REFERENCES

Perry, J. H.: "Chemical Engineer's Handbook," McGraw Hill Book Co., 2nd ed., N. Y., 1941, pages 2186 and 2385.